Jan. 12, 1960 J. C. TULLOSS 2,920,364
CABLE CLAMP FOR REEL ATTACHMENT
Filed Dec. 30, 1954

INVENTOR.
J. C. TULLOSS
BY
ATTORNEY

United States Patent Office 2,920,364
Patented Jan. 12, 1960

2,920,364

CABLE CLAMP FOR REEL ATTACHMENT

Joseph C. Tulloss, Baltimore, Md., assignor to Western Electric Company, Incorporated, New York, N.Y., a corporation of New York Application December 30, 1954, Serial No. 478,631

1 Claim. (Cl. 24—126)

This invention relates to attachments for cable reels, and more particularly to clamping devices for attaching cables to reels during coiling and uncoiling operations.

In order to facilitate the operations of coiling a cable upon a reel and subsequently uncoiling it therefrom, some convenient means must be provided to secure the cable to the reel. Particularly when the cable is being unwound from the reel, it is sometimes difficult to detach the trailing end of the cable from the reel without wasting a substantial length of the cable. The structure of the uncoiling apparatus, the need to maintain tension in the trailing end of the cable, and limitations in the working space around such apparatus, may make it so difficult to unwind all of the cable from the reel, that the last several feet of the cable must be cut off and discarded.

An object of this invention is to provide attachments for cable reels which facilitate the unwinding of cables from the reels.

Another object of this invention is to provide new and improved clamping devices for attaching cables to reels during coiling and uncoiling operations.

A device illustrating certain features of the invention may include a cable clamp secured to one end of an elongated strap having the other end thereof secured to the winding surface of a reel. The cable clamp is provided for securing a cable to the strap. The cable clamp may include a tubular member secured to the strap and a strip of rubber-like material with one end secured to the strap and the other end retroflexed and positioned adjacent to the tubular member so that the friction and wedging action of the retroflexed end will resist the removal of the cable from the tubular member.

A complete understanding of the invention may be obtained from the following detailed description of a specific embodiment thereof, when taken in conjunction with the appended drawings, in which.

Figure 1:
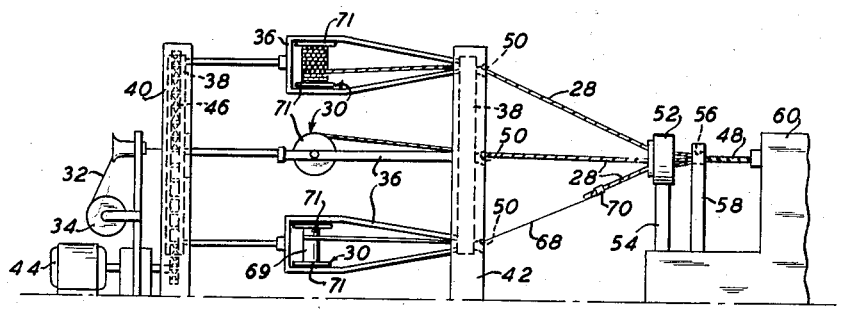
Fig. 1 is a schematic side elevation view of a cable stranding machine, in which reels of cable are being unwound with the aid of devices embodying the invention.

Referring to Fig. 1, there is shown schematically a typical cable stranding machine, in which a plurality of cables 28—28 are being unwound from a plurality of reels 30—30, and are simultaneously being twisted about a central core 32 which is being uncoiled from a reel 34. Although only three of the reels 30—30 are visible in the drawings, actually four of these reels are present and are distributed equidistantly around the central core 32. The reels 30—30 are supported rotatably within a plurality of cradles 36—36, which have their opposite ends carried by a pair of endless belts 38—38 mounted within a pair of vertical supports 40 and 42. Power obtained from a motor 44 is employed to rotate the belts 38—38 and thereby revolve the cradles 36—36 and the reels 30—30 about the longitudinal axis of the central core 32. At the same time the cradles 36—36 are caused to rotate slowly about their own axes by means of a gearing mechanism 46 mounted within the support 40. Meanwhile, the cables 28—28 and the central core 32 are drawn from their respective reels 30—30, and are formed into a resultant stranded cable 48. A capstan (not shown) in engagement with the cable 48 provides the necessary pulling force.

After the cables 28—28 leave the reels 30—30, they are drawn through a plurality of guide tubes 50—50 mounted within the support 42, and thence the cables travel to a distributing plate 52 mounted on a pedestal 54. The distributing plate 52 functions to cause the cables 28—28 to converge upon a forming die 56 mounted on a pedestal 58. Within the die 56 the cables 28—28 become twisted around the central core 32 to produce the stranded cable 48. Beyond the die 56 the cable 48 is advanced into a serving head 60, where a paper tape (not shown) is served spirally onto the stranded cable 48.

Whenever the supply of the cable 28 or the core 32 on any one of the reels 30—30 or the reel 34 respectively, becomes exhausted, it becomes necessary to stop the operation of the entire apparatus to substitute a full reel of cable 28 or core 32 for the empty one. The apparatus is stopped before the trailing end of the cable 28 or core 32 drawn from the exhausted reel has passed through the stranding machine, and this end of the cable 28 or core 32 is then spliced to the leading end of the cable 28 or core 32 on the full reel. Due to the fact that the cable 28 is most readily accessible for splicing purposes in the vicinity of the distributing plate 52, the splicing is performed in the zone extending between this point and the die 56.

In the past the usual practice was to have the inside end of the cable attached directly to the reel. Consequently, it was necessary to stop the stranding machine before all of the cable 28 had been actually unwound from the reel 30 which appeared about to become exhausted. Furthermore, due to limitations in the working space available around the apparatus, the trailing end of this cable 28 was cut in the vicinity of the splicing location. This practice made it necessary to discard the length of cable 28 extending from the empty reel 30 to the splicing location, which sometimes resulted in wasting as much as ten feet of the cable 28 in each splicing operation.

In accordance with the present invention, the cable reels 30—30 are provided with an improved means for attaching the cables 28 to the reels 30—30 during the coiling and the uncoiling operations. Specifically, the reel 30 is provided with an elongated, extension strap 68 designed to secure the cable 28 to the reel 30, and to permit the entire length of the cable 28 to be withdrawn from the reel 30 before the cable 28 is detached therefrom. The strap 68 may be conveniently made from the flat steel tape employed in commercial banding machines.

When the reel 30 is empty or when winding operations are about to commence the strap 68 remains wrapped helically around the drum portion 69 of the reel 30. One end of the strap 68 is provided with a tubular grip 70 designed to engage the cable 28, and the other end of the strap 68 is secured to the winding surface of the drum portion 69 of the reel 30 adjacent to one of the reel flanges 71—71, by appropriate means. When the entire length of the strap 68 is coiled on the reel 30 the grip 70 is located adjacent to the other one of the reel flanges 71—71.

In the stranding machine illustrated in Fig. 1, when any of the reels 30—30 on the cradles 36—36 became exhausted, it was formerly necessary to cut off the trailing ends of the cables 28—28 while they were still attached to the reels 30—30. The cables 28—28 were severed between the disturbing plate 52 and the forming die 56, because this location was most easily accessible to the operator. Now, by providing attachments embodying the invention, such as an extension strap 68 having a tubular grip 70 secured at one end thereof, it is possible for the cables 28—28 to be withdrawn entirely from the reels 30—30 and for the trailing ends of the cables 28—28 to be advanced to the distributing plate 52 before their connection with the reels 30—30 is detached.

Figure 2:
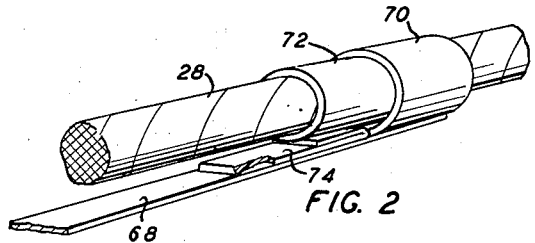
Fig. 2 is an enlarged perspective view of a portion of a cable positioned in a clamping device embodying the invention.
Figure 3:
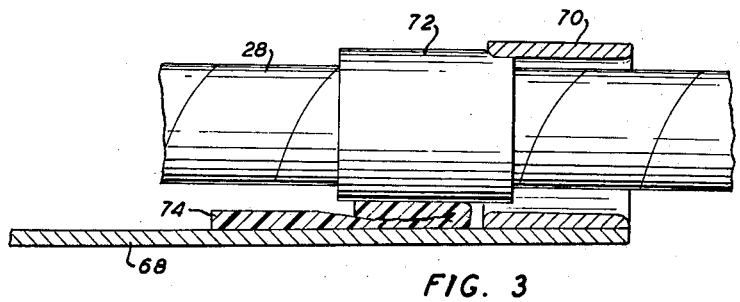
Fig. 3 is an enlarged, fragmentary, vertical section taken along the longitudinal axis of the clamping device of Fig. 2.

Details of the manner in which the strap 68 engages the cable 28 are best shown in Figs. 2 and 3. The tubular grip 70 at the end of the strap 68 encircles the cable 28 and is in snug engagement with a piece of adhesive tape 72, such as "Scotch" masking tape. A few turns of the adhesive tape 72 are wrapped around this one portion of the cable 28 to create an enlarged frictional surface. The tubular grip 70 is sufficiently large in diameter to be able to slide along the cable 28 in loose contact therewith, except where it contacts the frictional surface provided by the adhesive tape 72. In order to provide further reinforcement of the engagement of the grip 70 at the point where the tape 72 is located, a rubber strip 74 is retroflexed or folded upon itself and secured to the strap 68 adjacent to the grip 70. The strip 74 likewise provides an enlarged frictional surface on the strap 68, which conveniently becomes wedged against the enlarged frictional surface provided by the tape 72 on the cable 28.

The specific embodiment of the invention described herein may be modified to suit special requirements without departing from the spirit and the scope of the invention. For example, instead of employing the specific tubular grip 70 in devices embodying the invention, any other type of grip or clamp capable of securing a cable may be utilized. It is also contemplated that the extension strap 68 of devices embodying the invention must be sufficiently long to extend for a substantial distance outwardly beyond the flanges 71—71 of a reel 30 while still being secured to the drum portion 69 thereof.

Preferably, the extension strap 68 should be several times as long as the maximum diameter of the reel 30 to which it is attached, so that the cables 28 secured thereto by the grip 70 may be uncoiled and advanced for a substantial distance away from the reel 30 while remaining connected thereto.

Although the invention has been described only in connection with cables, the advantages of the invention can be realized in connection with any other filamentary articles, such as cords, strands, wires, or the like.

What is claimed is:

A grip for an elongated article, which comprises a flexible stem portion, a tubular member secured adjacent to one end of the stem, the tubular member being of sufficient size to encompass the elongated article, a member wrapped around a portion of the elongated article to form an enlarged frictional surface thereof, and a strip of pliant material having a relatively high coefficient of friction on the surface thereof, one end of the strip being free, retroflexed and positioned adjacent to the tubular member, whereby when the elongated article is inserted into the tubular member in one direction the friction and wedging action of the retroflexed, free end of the strip of pliant material against the enlarged frictional surface formed by the member wrapped on the article will resist the removal of the elongated article from the tubular member in the opposite direction.

References Cited in the file of this patent

UNITED STATES PATENTS

| | | |
|---|---|---|
| 699,502 | Durland | May 6, 1902 |
| 900,530 | Harbour | Oct. 6, 1908 |
| 1,184,369 | Mote | May 23, 1916 |
| 1,498,133 | Swem et al. | June 17, 1924 |
| 1,672,214 | Hayden | June 5, 1928 |
| 2,519,245 | Greenleaf et al. | Aug. 15, 1950 |
| 2,571,341 | Cordrey et al. | Oct. 16, 1951 |
| 2,596,536 | Dale | May 13, 1952 |
| 2,650,397 | Nemser | Sept. 1, 1953 |
| 2,720,634 | Hart | Oct. 11, 1955 |